United States Patent [19]

Hurditch

[11] Patent Number: 6,077,584
[45] Date of Patent: Jun. 20, 2000

[54] STABILIZED DYE COMPOSITIONS FOR OPTICAL RECORDING MEDIA

[75] Inventor: Rodney J. Hurditch, Providence, R.I.

[73] Assignee: Media Chemical Corp., Trumbull, Conn.

[21] Appl. No.: 09/121,906

[22] Filed: Jul. 24, 1998

[51] Int. Cl.$^7$ ........................................... B32B 3/00
[52] U.S. Cl. ................ 428/64.1; 428/64.4; 428/64.8; 428/913; 430/270.14; 430/270.18; 430/270.2; 430/495.1; 430/945; 368/283; 368/288
[58] Field of Search ................ 428/64.1, 64.2, 428/64.4, 64.8, 913; 430/270.14, 270.18, 270.2, 495.1, 945; 369/283, 288

[56] References Cited

U.S. PATENT DOCUMENTS

| | | | |
|---|---|---|---|
| 4,656,121 | 4/1987 | Sato et al. | 430/495 |
| 4,923,390 | 5/1990 | Oguchi et al. | 430/270 |
| 4,944,967 | 7/1990 | Yabe et al. | 430/270 |
| 4,944,981 | 7/1990 | Oguchi et al. | 428/64 |
| 4,990,388 | 2/1991 | Hamada et al. | 428/64 |
| 4,999,281 | 3/1991 | Inagaki et al. | 430/495 |
| 5,080,946 | 1/1992 | Takagisi et al. | 428/64 |
| 5,161,150 | 11/1992 | Namba et al. | 369/275.4 |
| 5,213,955 | 5/1993 | Hamada et al. | 430/276 |
| 5,275,925 | 1/1994 | Mihara et al. | 430/495 |
| 5,316,814 | 5/1994 | Sawada et al. | 428/64 |
| 5,326,679 | 7/1994 | Yanagisawa et al. | 430/495 |
| 5,328,741 | 7/1994 | Yanagisawa et al. | 428/64 |
| 5,328,802 | 7/1994 | Yanagisawa et al. | 430/273 |
| 5,336,584 | 8/1994 | Yanagisawa et al. | 430/273 |
| 5,356,685 | 10/1994 | Fleming | 428/64.1 |
| 5,362,536 | 11/1994 | Fleming | 428/64.1 |
| 5,415,914 | 5/1995 | Arioka | 428/64.1 |
| 5,482,822 | 1/1996 | Mihara et al. | 430/270.14 |
| 5,605,732 | 2/1997 | Mihara | 428/64.8 |

FOREIGN PATENT DOCUMENTS 353 393 B1  8/1995  European Pat. Off. .

OTHER PUBLICATIONS

K. Naba et al.; "Development of Lighfast Cyanine Dyes For Recordable CD"; 1993 Proceedings of International Dye Chemistry Conference; pp. 706–713.

K. Naba et al.; "Application of Functional Dyes to Optical Memory Disks"; 1993 Proceedings of International Dye Chemistry Conference; pp. 349–356.

F. Matsui et al.' "An Optical Recording Disk Using An organic Dye Medium In Regard to Provide Interchangeability To The Disks Using Different Organic Dyes", IEEE Translation Journal on Magnetics in Japan; pp. 789–798 (1988).

E. Hamada et al.' "CD–Compatible Write–Once Disc With High Reflectivity", SPIE vol. 1078 Optical Data Storage Topical Meeting, pp. 80–87 (1989).

*Primary Examiner*—Elizabeth Evans
*Attorney, Agent, or Firm*—Todd E. Garabedian; Willaim A. Simons; Wiggin & Dana

[57] ABSTRACT

A composition suitable for forming an optical information recording layer for carrying out recording and readout with laser beams, which comprises at least one cyanine dye, and at least one leuco compound of formulae (VII) or (VIII); and optionally, at least one aminium compound of formulae (IV) or (V).

32 Claims, No Drawings

STABILIZED DYE COMPOSITIONS FOR OPTICAL RECORDING MEDIA

BACKGROUND OF THE INVENTION

1. Field of the Invention

The present invention relates to recording layer compositions for use in optical recording media, and preferably recording layer compositions for use in recordable compact disc (CD-R) media and recordable digital videodisc (DVD-R) media. In particular, these recording layer compositions contain the combination of selected cyanine dyes with at least one selected leuco compound. This combination has been found to provide enhanced dye solution stability and dye layer photostability, as well as provide good recording properties. Furthermore, the present invention relates to substrates coated with these recording layer compositions, as well as recordable medium including such coated substrates.

2. Brief Description of the Art

Several technologies have emerged in the writable optical recording media art. These include the so-called "Write Once Read Many" (WORM) recording media, the CD-Recordable (CD-R) recording media and the recordable digital videodisc (DVD-R) recording media.

In WORM recording media, information is recorded onto the recording layer in the form of a pit "burned in" by an incident laser beam. This laser burning operation involves transient temperatures of above 1000° C., which causes ablation of the recording media and forms the desired pit. The recording layer in WORM recording media may be various materials such as metal films, organic dye films or mixtures of dyes and polymers in film form. Reproduction of this information thus stored in a WORM recording media is generally accomplished by irradiating the media with another laser beam that has a weaker output than for recording. The irradiation differences (or contrast) between the pitted areas and the non-pitted areas on the recording media are read as electric signals, which are then translated into useful information.

CD-R recording media have been developed as an alternative to WORM media. Because CD-R media may be used with the widely available read-only CD-ROM audio and computer equipment, it has been favored over WORM for many commercial applications. CD-R media generally utilize a recording layer of organic dye positioned between a substrate and a reflective layer. Like WORM media, information is reproduced onto the CD-R recording layer by means of a laser beam. However, the transient temperature rise resulting from the absorption of radiation of this incident laser beam is far less in CD-R recordings than with WORM recordings. Typically, CD-R media experience only a 200–300° C. transient temperature rise. In CD-R recording, the resulting organic dye recording layer decomposition in combination with the concurrent thermal diffusion of both the dye and the substrate, along with deformation of the reflecting layer, causes local changes in the optical properties of CD-R media that result in an adequate signal-to-noise ratio (SNR) when played with a second, but weaker, laser beam. In both WORM and CD-R recording, the laser wavelength is typically in the range 770–830 nm and the recorded spot size is about 0.80 μm.

Besides the presence of the reflective layer that forms an optical interface with the recording layer, CD-R media differ from the WORM media in at least one other important way. In order to attain the desired high (65–70%) reflectivity needed to meet CD-R standards, as set forth in the Philips and Sony Orange Book Part 2 (CD-R Standards version 2.0, published by Philips Consumer Electronics BV, November, 1994), the CD-R recording layer has a lower absorption for light at the recording wavelength. In contrast, WORM technology employs a higher optical recording absorption layer.

DVD-R has recently been introduced as an improvement to both WORM and CD-R technologies. DVD-R recording processes allow for greater density of data to be stored on a storage disc having the same storage area. This is achieved by reducing the laser wavelength and the recording spot size. In DVD recording systems, the recording laser wavelength is around the 630–650 nm range and the spot size is about 0.40 μm.

Regardless of the type of recording system, the wavelengths suitable for the recording and reproduction of optical data are limited by the availability of reliable, compact lasers. This is especially true for consumer applications where the lasers must also be low cost, diode type which have a limited selection of output wavelengths. For this reason, these types of recording media must be capable of being adjustable with respect to optical properties such as absorption and reflectivity in order to tune their response to particular laser wavelengths.

In WORM, CD-R and DVD-R media, the dye recording layer is generally formed on a pre-grooved substrate (e.g., an injection molded disc of polycarbonate). The grooves are present to facilitate the guiding of the laser beam both on recording and upon subsequent reproduction of the recorded signal. The dye recording layer is deposited by spin-coating a solution of the dye components in such a manner as to produce a radially uniform thickness deposited both within the grooves and on the adjacent lands between the grooves.

For a typical optical recording medium the average film thickness of the dye layer over the lands and grooves of the substrate is in the range 50 to 160 nm, and preferably for CD-R is typically in the range of 70 to 130 nm and preferably for DVD-R is typically in the range of 50 to 120 nm.

The compounds used in WORM, CD-R and DVD-R optical data recording layers generally include certain classes of organic dyes in which the optical absorption characteristics may be manipulated to achieve the best overall combination of functional characteristics, such as write sensitivity, read stability, solubility in coating solvent, shelf life, and other properties known to those skilled in the art. These organic dyes also offer low thermal conductivity which results in low heat loss and higher writing sensitivity (reduced laser power) compared with other highly absorbing materials such as metal films. The preferred classes of organic dyes used in many optical data recording layers are cyanine dyes, particularly indo and benzindo carbocyanine dyes. Structures of particular examples of these cyanine dyes are shown in formulae (I), (II), and (III) below:

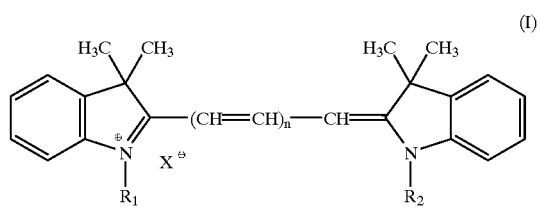

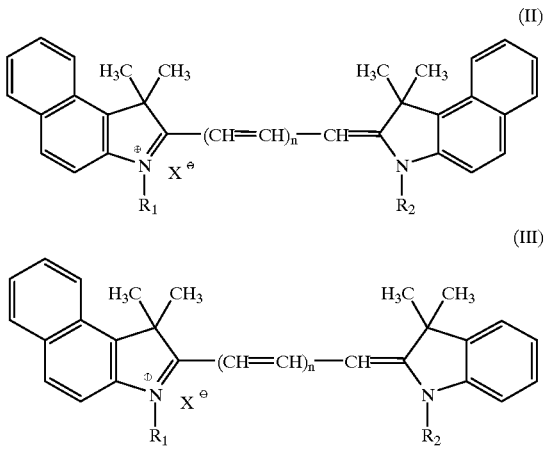

wherein X⁻ is a selected counteranion and $R_1$ and $R_2$ are alkyl groups having from 1 to 4 carbon atoms and $(CH=CH)_n$ represents a polymethine chain where the number of polymethine units n=1–3. These cyanine dyes have been used widely in the manufacture of recordable optical discs. Other advantages of these classes of cyanine dyes in optical data recording applications are the relative ease of synthesis and the acceptable thermal and photochemical stability.

The wavelength region of maximum light absorption in any particular cyanine dye (or the intensity of absorption at a given wavelength) depends on the structure of the organic cation and in particular on the length of the methine chain which joins the indole or benzindole moiety and is defined by n in the above formulae. Thus, by varying n, the wavelength sensitivity to a particular recording laser wavelength may be altered. For WORM media, for which a higher absorption at the same recording wavelengths is required compared with CD-R or DVD-R media, n is usually 3. For CD-R media, having a recording wavelength in the 770–790 nm range, n is typically 2. For DVD-R media having a recording laser wavelength in the range 630–650 nm, n is typically 1. In compositions where it is advantageous to finely adjust the optical properties of the dye layer, a mixture of cyanine dye components is often preferred, in which each cyanine dye component may have a different value of n.

The use of cyanine dyes alone or in combination with other ingredients as a recording layer has been described in many U.S. patents. For example, see U.S. Pat. No. 4,600,625 (Ricoh); U.S. Pat. No. 4,656,121 (Ricoh); U.S. Pat. No. 4,923,390 (Canon); U.S. Pat. No. 4,944,967 (Fuji Photo Film); U.S. Pat. No. 5,155,009 (Pioneer); U.S. Pat. No. 5,161,150 (TDK); U.S. Pat. No. 5,213,955 (Taiyo Yuden); U.S. Pat. No. 5,275,925 (Canon); U.S. Pat. No. 5,316,184 (Fuji Photo Film); U.S. Pat. No. 5,318,882 (Taiyo Yuden); U.S. Pat. No. 5,328,741 (Pioneer); U.S. Pat. No. 5,328,802 (Pioneer); U.S. Pat. No. 5,336,584 (Pioneer); U.S. Pat. No. 5,482,822 (Canon); U.S. Pat. No. 5,512,416 (TDK); and U.S. Pat. No. 5,605,732 (Canon). The majority of these patents are directed to dye compositions having certain improvements with regard to (1) solubility in coating solvents which do not damage the substrate; (2) stability against thermal oxidation and photooxidation; (3) reduced dependence of the recording characteristics on wavelength of the laser light; (4) higher recording sensitivity; and (5) higher recording and read-out stability. Past improvements include combinations of one or more cyanine dyes with stabilizers, often referred to as quenchers. Quenchers based on transition metal complexes especially dithiol complexes of Ni, Co, Mn or Cu, such as described in U.S. Pat. No. 5,512,416 assigned to TDK Corporation are especially useful in stabilizing cyanine dyes against photochemical and thermal oxidation.

Additionally, certain types of aromatic tertiary amines capable of forming stable radicals are widely used to stabilize cyanine dyes. These may be optionally combined with a metal-dithiol complex. For example, U.S. Pat. No. 4,656,121 assigned to Ricoh Company Ltd. discloses the cationic form of particular aminium dyes used in conjunction with selected cyanine dyes suitable for WORM recording media.

Other classes of compounds, which can be used as light stabilizers, include nitrosoaniline derivatives, nitrosophenols, nitrosodiphenylamines and 1-pycryl-2,2-diarylhydrazyl free radicals as disclosed for example, in U.S. Pat. No. 5,318,882 assigned to Taiyo Yuden Co., Ltd.

Preferred compounds of the amine type, in the cationic aminium form, which absorb strongly in the near infra red, such as those shown in formulae (IV) and (V), below, have been found to be particularly suitable. These structures are as follows:

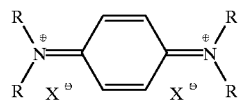

where each R=

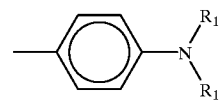

and wherein each $R_1$ is individually selected from an alkyl group having a number of carbon atoms from 2 to 5 and X⁻ is a counteranion; and

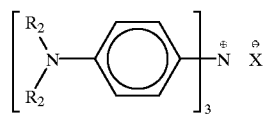

where each $R_2$ is an alkyl group having a number of carbon atoms from 2 to 5.

U.S. patent application Ser. No. 08/869,870 filed Jun. 2, 1997 discloses combinations of cyanine dyes and aminium near infra red absorbing dyes shown in the above formulae (IV) and (V) in which the anion is hexafluoroantimonate and which provides additional benefits of improved resistance to variation of the recording wavelength and excellent photostability as measured on the solid films cast from the dye solution mixtures.

Stabilizers of the types described in formulae (IV) and (V) above absorb light usually in the near infra red range of the visible spectrum. While this absorption in the case of certain of these compounds such as the aminium type, may be used to advantage to reduce the wavelength dependence of the absorption of certain cyanine dyes alone as disclosed in U.S. patent application Ser. No. 08/746,449 filed Nov. 8, 1996, the changes thus produced may limit the amount of stabilizer which can be added to the formulation to provide adequate photostability of the dye recording layer. This arises because too high a concentration of the stabilizer may result in too high an absorption at the recording wavelength and the resulting disc will not achieve the high reflectivity of >65% as set forth in the Orange Book Part 2 ver 2.0.

In addition to the photo stability required for the dye recording layer, it is also important that a solution of the dye used to deposit the recording layer exhibits high solution stability.

For example, the economic production of optical discs requires that the dye solution can be recovered and reused after the initial spin coating process. During the spin-coating, only a small amount of the dye solution, approximately less than 0.5%, is actually deposited upon the substrate. The remaining (spent) dye solution is spun off and collected into a bowl or a cup, from which it can be drained into a receiving vessel. Ideally, the spent dye solution should be reusable after making an adjustment to the composition to allow for solvent losses occurring during evaporation. This process is referred to as recycling and enables a much larger number of discs to be produced from the original dye solution. During the spin-coating process, solvent loss occurs by evaporation, which in principle can easily be adjusted for by the addition of fresh solvent, in an amount calculated to restore the original concentration of the dissolved components. However, changes in composition of the dye solution occurring either on storage or during use, which result in a loss of one or more solid components by crystallization for example, or the formation of decomposition products of the components, make it much more difficult to reuse or recycle the dye solution, and thus the cost of manufacture can be prohibitively high.

Thus, the practicality of such a recycling process and in particular the ability to repeat the process after successive spin-coat cycles depends upon the solution stability of the formulated dye components.

In addition to the need for a stable dye recording layer and a stable solution, the solubility of the dye components and the stabilizer must be sufficiently high so that solutions suitable for depositing a thin film of the recording dye layer can be easily prepared.

For example, U.S. patent application Ser. No. 08/869,870 filed Jun. 2, 1997 discloses the use of cyanine dyes having certain anions which exhibit excellent solubility in ethyl lactate, a safe solvent which has desirable characteristics for spin coating on polycarbonate substrate, and a fairly rapid evaporation rate which results in a reduced cycle time for the coating process hence higher thruput for finished discs.

In the presence of an aminium dye stabilizer such as those shown in formulae (IV) and (V), or in the presence of combinations of an aminium dye stabilizer and a nickel, copper, manganese or cobalt dithiolato stabilizer, such cyanine dyes exhibit excellent stability against decomposition due to oxidation.

In many cases, stabilizers of the types described in the forgoing U.S. patents exhibit limited solubility in selected coating solvents which do not attack polycarbonate such as diacetone alcohol, ethyl lactate, tetrafluoropropanol and octafluoropentanol.

Furthermore, the aminium dye stabilizers, such as those shown in formulas (IV) and (V), may undergo decomposition in solution, which causes composition changes to occur over time which adversely affects the ability to recycle the dye solution. Moreover, a reduction in the concentration of the aminium dye stabilizer resulting from decomposition changes in the optical absorption of the recording layer produced upon spin-coating the solution, and may also reduce the ability of the recording layer to resist photo or thermal oxidation. Such changes impair the recording characteristics of the recording layer.

One advantage of the present invention over those stabilizers (quenchers) of the prior art is the improved solubility and greater solution stability of formulations of cyanine dyes with aminium-type stabilizers and formulations of cyanine dyes with combinations of stabilizers in desirable coating solvents that do not attack polycarbonate.

Another advantage is the improved photostability of the dye recording layer, which can be achieved without altering the desirable absorption properties of the dye mixture at the recording wavelength.

BRIEF SUMMARY OF THE INVENTION

Accordingly, one aspect of the present invention is directed to a dye composition useful for forming an optical information recording layer that is suitable for recording and readout with a laser beam, which comprises the combination of at least one compound consisting of at least one cyanine dye of formulae (VI):

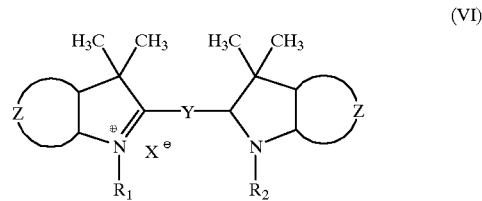

(VI)

wherein $R_1$ and $R_2$ independently represent alkyl groups, Z represents an atomic group for forming a substituted or unsubstituted aromatic ring, and Y represents a linking group for forming a carbocyanine and $X^-$ is an anion; and at least one leuco compound of formulae (VII) and (VIII):

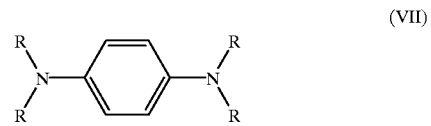

(VII)

where each R =

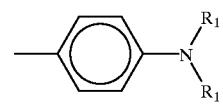

wherein each $R_1$ is independently selected from an alkyl group having a number of carbon atoms from 2 to 5; and

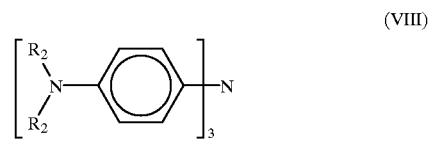

(VIII)

where each $R_2$ is independently selected from an alkyl group having a number of carbon atoms from 1 to 5.

The presence of the leuco compound increases the photostability of the dye layer, stabilizes the dye solution such that the composition remains constant over extended periods of time, enabling the solution to be utilized much more effectively and economically, and additionally produces optical discs having improved recording characteristics at a range of recording speeds.

Another aspect of this invention is directed to a recordable medium substrate used in a recording medium (e.g., polycarbonate disc) coated with the above-noted dye composition.

Still another aspect of this invention is directed to a recordable medium comprising (a) a protective layer; (b) a reflective layer in proximity to the protective layer; (c) a recording layer in proximity to the reflective layer and forming an optical interface with the reflective layer, the recording layer comprising the above-noted dye composition; and (d) a transparent substrate on which the recording layer is formed.

Yet another aspect of the present invention is directed to a recording system utilizing the above recordable medium.

DETAILED DESCRIPTION OF PREFERRED EMBODIMENTS

One preferred embodiment of the present invention is a CD-R or DVD-R dye composition that is based on the above-noted cyanine dyes of formulae (I), (II) and (III) which may be present in combination with one or more of the above noted leuco compounds of formula (VII) and (VIII) are added in an amount ranging from 5% to 35% by weight of the leuco compound based on the total solids content of the formulation. Optionally, one or more of the aminium dyes of formula (IV) and (V) may also be present.

The optical recording medium of the invention is an optical recording disc having this particular type of dye as a recording layer and a reflective layer deposited thereon. The optical recording disc is capable of reproduction in accordance with the CD-Standard as set forth in Philips Sony Orange Book (CD-R Standards version 2.0, published by Philips Consumer Electronics BV, November, 1994).

The preferred substrate for the dye-containing recording layer is formed from a resin material (i.e., injection molded polycarbonate) which is substantially transparent to visible and near infra red light produced by a semiconductor laser. A spiral tracking groove (often referred to as the pregroove) is formed on the surface of the substrate where the recording layer is formed during the molding process. Typically, the groove has a depth of 100–250 and a width of 0.4 to 0.9 $\mu$m. Adjacent groove tracks are separated by a land portion and the combined width of land and groove (defined as the pitch) is typically about 1.6 $\mu$m for CD-R and 0.80 um for DVD-R media.

Preferred cyanine dyes of the present invention are those based on indole and benzindolecarbocyanines shown in formulae (I), (II) and (III), in which n the number of methine groups in the polymethine chain joining the indole moieties can vary from 1 to 3, and the preferred substituents $R_1$ and $R_2$ are individually selected from lower alkyl groups having from 1 to 4 carbon atoms being present on the nitrogen atom of the indole ring. The anion $X^-$ may be perchlorate, iodide, bromide, aromatic sulfonate (e.g., toluensulfonate), propionate, aromatic carboxylate (e.g., benzoate), thiocyanate, ferricyanide, lactate, hypophosphite, tetracyanonickelate, trifluoromethanesulfonate, ferricyanide, 4-hydroxybutyrate, nitrite, sulfate, 2-(3',5'-dimethyl-2'-hydroxylphenyl)-2H-benzotriazole-4-sulfonate, 1,2-napthoquinone-2-diazide-5-sulfonate, picrate, azide or the like.

Preferably, the cyanine dye is an asymmetric cyanine dye. Also, it is preferred that the cyanine dye or dyes amount to about 60% to about 95% by weight of the total solids in said dye composition.

The aminium dye, if present, is selected from those shown in formulae (IV) and (V) as described, in which the anion is preferably hexafluoroantimonate, perchlorate, tetrafluoroborate, or pentafluorophosphate.

If used, the aminium dye is present in amount of about 30%–5% by weight of total solid components, more preferably in an amount of 25% 10% by weight.

The leuco compound is selected from those shown in formulae (VII) and (VIII) as described, above. These leuco compounds have been commercially used before as intermediates for the aminium compounds of formulae (VI) and (V), above, and are described in U.S. Pat. Nos. 3,382,183; 3,400,156; and 3,485,650, all assigned to Cyanamid. More preferably, the leuco compound is present in amount of about 20–6% by weight of total solid components, most preferably, in an amount of 15%–7% by weight, when an aminium dye is also present. If the leuco compound is used without an aminium dye, then the more preferred amount of the leuco compound is from 10–25% by weight of the solid.

Preferred mixtures may also comprise at least one cyanine dye of formula (VI) in combination with one or more aminium dyes of formula (VI) or (V) plus one or more of the leuco compounds of formulae (VII) or (VIII). More preferably, the cyanine dye or dyes are selected from formulae (I), (II) or (III). And preferably, each component and the preferred amount of each component are selected such that the combination in an appropriate ratio produces most desirable recording and replay characteristics for a given substrate pregroove depth and film thickness, including having the ability to provide the widest process window, having the highest yield in manufacturing and having the ability to be fine tuned for a particular laser wavelength.

A nickel, copper, manganese or cobalt complex stabilizer ("quencher") may be also optionally added to the light absorbing dye mixture to enhance the stability of the recording medium to heat, moisture and light. These preferred stabilizers are multifunctional and are capable of acting as an excited state quencher, a singlet oxygen quencher as well as a deactivator of peroxy, hydroperoxy or alkoxy radicals. Nickel, copper, manganese or cobalt complexes such as bis(dithiol), thiocatechol, thiobisphenolate or dithiol types are preferred classes of these quenchers.

If used, the metal complex stabilizer may be added in an amount of about 1 to 25% by weight, and preferably 5–15%.

The recording layer has an index of refraction n (the real part of the complex index of refraction) of about 2.2 to 2.8 at the wavelength of the recording and reading light. A high value of n is required to provide adequate signal modulation on recording, and results from the combination of the high absorption coefficients and broad absorption bands of the selected dyes in the desired wavelength regions, and the compatibility of the dye components of the mixture in the solid film form.

The recording layer is formed by dissolving the dye component together with any additional stabilizer in a coating solvent at a concentration in the range of 3–10% by weight of the total solid components in the solution. Prior to application by the spin coating, the solution is filtered through an inert filter material such as TEFLON (tetrafluoroethylene polymer) or polypropylene with a pore size of about 0.2 $\mu$m to remove particulate matter that might otherwise result in coating defects. The dyes and other components of the mixture must be sufficiently purified so that impurities having poor solubility in the coating solvent do not precipitate as the solvent is removed during the coating process or interfere with the desirable optical characteristics as photostability of the dyes. Suitable solvents or solvent mixtures must not dissolve the substrate material and yet have good solvency for the dye components. Suitable solvents usually have a balance between polarity and hydrogen bonding activity, having either keto, alkoxy, hydroxy, ether or ester functionality, and may combine more than one function or may be a mixture of two or more solvents. Typical solvents for use with the dye mixtures of the present invention comprise, diacetone alcohol, ethyl lactate, tetrafluoroprapanol, octafluoropentanol, which may be used singly or in combination. Additional cosolvents which may be added to the above solvents to improve the spin coating characteristics and/or further modify the solvency characteristics include aliphatic or cycloaliphatic alcohols, butyl lactate, ethyl-3-ethoxypropionate, and propylene glycol monomethyl ether which may be used singly or in combination.

As minor components, polymer binders such as polyalkylacrylates, polyvinylacetates, polyamides, polyvinylcarbazoles or polycarbonates may be added to increase solution viscosity or improve film forming characteristics. Surfactants or leveling agents may also be added to improve coating uniformity.

Preferably the recording layer thus formed has a film thickness of about 70 to 200 nm, although the exact thickness is chosen by those skilled in the art to correspond to a range in which the reflectivity is relatively high so that the CD-R specifications of the Philips Sony Orange Book may be achieved. Reflectivity exhibits strong nonlinear dependence on the film thickness due to the thin film interference effect, and depends also on the substrate pregroove dimensions due to the optical phase difference between the land and the groove.

After spin coating, the dye layer may be optionally dried to further remove residual solvent and improve uniformity of the recording characteristics.

A metallic reflective layer is deposited on the dye layer which may comprise one or more metals having high reflectivity in the range of the recording and reproduction wavelengths from 770–830 nm and having acceptable stability to heat, moisture, light, and oxygen. Metals or alloys may be selected from the group consisting of aluminum, platinum, copper, silver or gold. In the case of alloys, high reflectivity is available in which silver or gold is present in an amount of at least 30%. Gold is often preferred because of its high chemical stability and reflectivity. Silver is specially preferred because of its high reflectivity and relatively low cost. The metallic layer is formed typically by sputtering or other method known in the art. The thickness is preferably in the range 30–100 nm depending on the metal deposited. In the case of silver, other metals such as titanium, tantalum, nickel, manganese, chromium and the like may be alloyed with pure silver in amounts usually less than 20% to improve the sputtering efficiency and reduce the effect of stress.

A protective coat is formed on the surface of the metallic reflective layer and comprises a radiation curable resin, preferably of the UV curable type, which can be deposited as a liquid. The protective coat is formed by spin coating to produce a uniform layer of about 1 to 15 $\mu$m, preferably in the range 3–10 $\mu$m. Examples of radiation curable resins are monomers, oligomers, and polymer precursors having di- or tri- functional groups capable of crosslinking on exposure to radiation. Suitable compositions include acryl functionalized monomers such as ethylacrylate, ethylene or diethylene glycol acrylates, hexane glycol acrylates and methacrylates of pentaerythritol and trimethylpropane, and acryl modified elastomers of urethanes as well as other oligoester acrylates, caprolactones and modified urethanes incorporating functional groups such as carboxylic acid. Radiation curable resins based on modified thermoplastics having a UV curable functional group attached to the polymer chain including acrylate, allyl, vinyl or maleic groups may also be used. Examples of the thermoplastic resins include polyesters, polyamides, and polyimides. For UV curing, photopolymerization initiators or sensitizers are added to the radiation curable compositions.

The UV curable resin is designed to provide fast UV curability, low shrinkage, sufficient hardness and chemical resistance, especially to components used in the formulation of screen printing inks used to form a label on the protective layer.

CD-R recording may be carried out on the optical recording medium using a variety of equipment designed to meet the specifications given in the Orange Book. In such equipment a beam of recording light having a wavelength of 780 nm for example, is focused in the pregroove through the back of the substrate to form a recorded spot having a lower reflectivity than the surrounding unexposed region. The spot is detected in the reproduction process by means of a lower power laser beam that is reflected by the reflective layer through the substrate to a photodetector. During recording and reproduction, the substrate (disc) is rotated at a tangential velocity of 1.2 meters per sec or higher. The recording mechanism is described in the background to this invention.

DVD-R recording may be carried in substantially the same manner except that the recording light has a lower wavelength of 635 nm for example, and during recording and reproduction, the substrate (disc) is rotated at a tangential velocity of 3.8 meters per sec or higher. The dye formulation is selected for the desired recording wavelength comprising, for example, a mixture of dyes of formulae (I), (II), (III) in which n=1 or 2. The disc medium may optionally comprise a single recording layer (one-sided) or a double recording layer (two-sided). The recording mechanism is essentially the same as for CD-R recording and is described in the background to this invention.

The present invention is further described in detail by means of the following preparative methods and Examples. All parts and percentages are by weight and all temperatures are degrees Celsius, unless explicitly stated otherwise.

EXAMPLE 1

A mixture of 7.65% by weight of the cyanine dye of formula (III) above, in which n=2, $R_1$ is butyl, $R_2$ is propyl and $X^-$ is perchlorate and 0.95% of an aminium dye of formula (IV), above, in which the anion is hexafluoroantimonate and $R_1$ is butyl, and 0.65% of the leuco compound formula (VII) [tetrakis(butylaminophenyl) benzoquininediamine], above, in which $R_1$ is butyl, and 90.75 wt % of diacetone alcohol was prepared in an opaque bottle. The mixture was dissolved by rolling on a jar roller for 16 hrs. at room temperature.

0.5 gm of the rolled solution thus obtained was diluted to 100 ml with isopropanol in a volumetric flask. The spectroscopic absorbance of the solution was measured at 1080 nanometers, close to the peak absorption wavelength $\lambda_{max}$ of the aminium dye. 1 ml of the resulting solution was further diluted to 100 ml with more isopropanol. The spectroscopic absorbance of the resulting diluted solution was measured at the peak absorption wavelength $\lambda_{max}$ of the cyanine dye (669.5 nm).

The rolled solution was stored at room temperature and the two absorbance tests as described above were carried out approximately every 7 days for up to 67 days. The percentage reduction in absorbance at the cyanine dye $\lambda_{max}$ wavelength was found to be 1.5% after 60 days and the percentage reduction in absorbance of the aminium dye at 1080 nm after 67 days was 3.5%, thus showing these dye components exhibited excellent chemical stability as a solution in diacetone alcohol.

EXAMPLE 2

The method according to Example 1 was repeated except that the same aminium dye was present in an amount of 1.28 wt % and the same leuco compound was present in amount of 0.32 wt %. The percentage reduction in absorbance at the cyanine dye $\lambda_{max}$ wavelength was found to be 1.6% after 60 days and the percentage reduction in absorbance of the aminium dye at 1080 nm wavelength was 7.7% after 67 days, thus showing these same dye components in different relative amounts exhibited good chemical stability as a solution in diacetone alcohol.

EXAMPLE 3

The method according to Example 1 was repeated except that the same aminium dye was present in an amount of 0.65 wt % and the same leuco compound was present in amount of 0.95 wt %. The percentage reduction in absorbance of the cyanine dye $\lambda_{max}$ wavelength was found to be 1.9% after 60 days and the percentage reduction of absorbance of the aminium dye at 1080 nm by a maximum amount of 3.6% after 67 days, thus showing the dye components at different relative amounts exhibited excellent chemical stability as a solution in diacetone alcohol.

EXAMPLE 4

The method according to Example 1 was repeated except that the cyanine dye of formula (III) was replaced by a mixture of the cyanine dye of formula (I) in which n=2, $R_1$ and $R_2$ are propyl and $X^-$ is iodide being present in amount of 5.75 wt %, and the cyanine dye of formula(II) in which n=2, $R_1$ and $R_2$ are butyl and $X^-$ is perchlorate, being present in an amount of 1.9 wt %. The percentage reduction in absorbance of the cyanine dye mixture $\lambda_{max}$ wavelength was found to be 2.4% after 60 days and the percentage reduction in absorbance of the aminium dye at 1080 nm decreased by a maximum amount of 4.1% after 60 days, thus showing these dye components also exhibited excellent chemical stability as a solution in diacetone alcohol.

EXAMPLE 5

The method according to Example 1 was repeated except that the anion of the cyanine dye of formula (III) was the thiocyanate and the cyanine dye was present in an amount of 6.5 wt %, and the aminium dye was the aminium dye of formula (V) in which $R_2$ is ethyl, being present in an amount of 0.5 wt % and the leuco compound of formula (VIII) was present in amount of 0.35 wt % and the solvent was ethyl lactate in an amount of 92.6%. The percentage reduction in absorbance of the cyanine dye $\lambda_{max}$ wavelength was found to be 1.3% after 60 days and the absorbance of the aminium dye at 950 nm increased by a maximum amount of 2.8% after 60 days, thus showing these particular dye components also exhibited excellent chemical stability as a solution in ethyl lactate.

COMPARATIVE EXAMPLE 1

The method according to Example 1 was repeated except that the aminium stabilizing dye was present in an amount of 1.6 wt % and no leuco compound was present. The percentage reduction in absorbance at the cyanine dye $\lambda_{max}$ wavelength was found to be 1.9% after 55 days and the absorbance of the aminium dye stabilizer at 1080 nm decreased by a maximum amount of 40% after 55 days, thus showing the aminium dye component exhibited poor chemical stability as a solution in diacetone alcohol.

COMPARATIVE EXAMPLE 2

The method according to Example 5 was repeated except the solvent was ethyl lactate, the aminium dye of formula (IV) was present in the amount of 1.6 wt %. and no leuco compound was present. The percentage reduction in absorbance at the cyanine dye $\lambda_{max}$ wavelength was found to be 2.3% after 55 days and the percentage reduction of absorbance of the aminium dye at 950 nm decreased by a maximum amount of 23% after 55 days, thus showing the aminium dye component exhibited poor chemical stability as a solution in ethyl lactate.

The results of Examples 1–5 and Comparative Examples 1 and 2 show that solutions of mixtures of cyanine dye or dyes, aminium dye and the leuco compound suitable for the production of an optical data recording disc, are more stable against chemical decomposition than similar solutions containing the cyanine dye and aminium dye alone.

EXAMPLE 6

A mixture of 7.65% by weight of the cyanine dye of formula (III) in which n=2, $R_1$ is butyl, $R_2$ is propyl and $X^-$ is perchlorate, and 1.1% of an aminium dye of formula (IV), in which the anion is hexafluoroantimonate and each $R_1$ is butyl, and 0.55% of the leuco compound of formula (VII) wherein each $R_1$ is butyl, and 90.7 wt % of diacetone alcohol were dissolved by rolling on a jar roller for 16 hours at room temperature. The resulting solution was filtered through 0.2 µm polypropylene filter, and coated onto a pre-grooved polycarbonate disc substrate in which the groove depth was 220 nm and the width was 0.65 microns, to form a uniform dye layer of average thickness of 90 nm. The spin parameters used in the coating process were adjusted so that the resulting discs produced a ratio of the reflectivity in groove to the reflectivity in the land of 0.85 to 0.95 as measured on an APEX CD-R test instrument. The spent dye solution which was spun-off from the disc into the spin cup was collected in a receiving vessel. The dye layer was heated in a drying oven at 60° C. for 10 minutes and a light reflecting layer comprising a silver film of 55 nm thickness was formed on the dye layer by vacuum deposition in a sputtering chamber. A protective layer comprising a UV curable lacquer was deposited by spin coating onto the silver layer and cured by means of ultra-violet radiation. Fabricated sample discs were tested using the APEX CD-R Tester to measure the laser recording power and recording/reproduction characteristics in accordance with the standard procedures described in the Philips-Sony Orange Book part 2. The recording power was 6.2+/−0.1 mW at 1×, 8.4 +/−0.2 mW at 2×, 12.0+/−0.2 mW at 4× speed, and 18 mW at 6× speed and the recording characteristics at all speeds met the Standards as described in the Orange Book.

EXAMPLE 7

To the spent dye solution collected in the receiving vessel of the spin-coater used to produce the optical recording disc as described in Example 6 was added an amount of diacetone alcohol solvent so that the absorbance peak of the cyanine dye component measured in accordance with the method of Example 1 was equal to the absorbance of the freshly prepared dye solution prior to spin-coating. The solution was filtered through a 0.2 μm polypropylene filter and coated on the spin-coater to produce optical recording discs in accordance with the method of Example 6. Fabricated sample discs were tested using the APEX CD-R Tester to measure the laser recording power and recording/reproduction characteristics in accordance with the standard procedures described in the Philips-Sony Orange Book part 2. The recording power was 6.3+/−0.1 mW at 1×, 8.6+/−0.2 mW at 2×, 12.0+/−0.2 mW at 4× speed, and 18 mW at 6× speed and the recording characteristics at all speeds met the Standards as described in the Orange Book.

EXAMPLE 8

The method according to Example 7 was repeated except that the formulated dye solution used for preparing the optical recording discs was recycled by the simple solvent addition procedure up to four times. The resulting discs again met the Standards as described in the Orange Book at recording speeds of 1×–6×.

EXAMPLES 9A, 9B and 9C

The methods according to Examples 6 and 7,8 were repeated except that gold was deposited as the reflective layer. The sputtering conditions were adjusted to achieve a thickness of the sputtered gold layer of 60 nm. The resulting discs met the Standards as described in the Orange Book at recording speeds of 1×–6×.

The results of Examples 6 through 9C show that preferred dyes of the present invention in combination with aminium dye stabilizers and the leuco compound when formulated in spin coating solutions using diacetone alcohol as a solvent, exhibit excellent chemical stability and the unused portion of the dye solution remaining after spin coating can be recycled for reuse by means of the simple addition of the parent coating solvent to produce optical recording discs which meet the CD-standards as set forth in the Orange Book at recording speeds of 1×, 2×, 4× and 6×.

EXAMPLE 10

A mixture of 7.30% by weight of the cyanine dye of formula (III), in which n=2, $R_1$=butyl, $R_2$=propyl and $X^-$=perchlorate and 2.00% of the leuco compound formula (VIII) [tris(diethylaminophenyl)amine] in which each is $R_2$=ethyl, and 90.70 wt % of diacetone alcohol was prepared in a 17 ml glass sample tube by agitating the mixture using a Telsonics 100 watt ultrasonic processor for 3–5 minutes depending on the volume. The resulting solution was filtered through a 0.2 μm Supor filter, and coated to a uniform film having an optical density measured at 670 nm of 1.8 to 2.0 using a spin-coater onto a pre-grooved polycarbonate substrate.

Samples cut from the dye-coated polycarbonate disc were placed in a light exposure unit comprising two closely spaced fluorescent tubes, having a spectrum with enhanced emission in the spectral range 550–750 nm. The samples were held in close proximity to the tubes and received an exposure of about 10,000 lux intensity for a period of 90 hours. The optical density at a wavelength of 670 nm being close to the cyanine dye peak absorption was measured before and after exposure, and the percentage reduction of the dye layer optical density was found to be only 5.7%, showing good photostability.

EXAMPLE 11

The method according to Example 10 was repeated except that the cyanine dye of formula (III) had n=1, $R_1$ and $R_2$=15 propyl and $X^-$=thiocyanate and was present in an amount of 6.70%; the leuco compound formula (VIII) was present in an amount of 2.00% and the solvent was a mixture of equal parts by weight of ethyl lactate and diacetone alcohol in a total amount of 91.30%. The percentage reduction of the optical density of dye layer after 90 hours exposure measured at 578 nm was found to be only 16.2%, showing good photostability.

EXAMPLE 12

The method according to Example 10 was repeated except that the anion of the cyanine dye of formula (III) was $X^-$=thiocyanate and was present in an amount of 6.64%. An aminium dye of formula (V) in which $R_2$=ethyl was present in an amount of 0.72% and the leuco compound formula (VII) in which $R_1$=butyl was present in an amount of 0.75%, and the ethyl lactate solvent in an amount of 91.89%. The percentage reduction of the optical density of dye layer after 90 hours exposure was measured at 670 nm and found to be only 12.4%, showing good photostability.

EXAMPLE 13

The method according to Example 12 was repeated except that the leuco compound of formula (VII) was present in an amount of 1.34% and the solvent ethyl lactate in an amount of 91.30%. The percentage reduction of the optical density of dye layer after 90 hours exposure was measured at 670 nm and found to be only 9.1%, showing good photostability which was greater than that of Example 12. This shows that small increase in the leuco compound alone will increase photostability.

EXAMPLE 14

The method according to Example 10 was repeated except that the cyanine dye of formula (III) was present in an amount of 7.56%, and an aminium dye of formula (IV) in which each $R_1$=butyl was present in an amount of 1.51% and a leuco of formula (VII) in which each $R_1$=butyl was present in an amount of 0.76%, and the diacetone alcohol was present in an amount of 90.17%. The percentage reduction of the optical density of dye layer after 90 hours exposure was measured at 670 nm and found to be only 7.7%, showing good photostability.

EXAMPLE 15

The method according to Example 14 was repeated except that the cyanine dye of formula (III) had n=1, $R_1$=butyl, $R_2$=propyl and was present in an amount of 7.56%, and the aminium dye of formula (IV) was present in an amount of 1.10% and the leuco compound of formula (VIII) in which each $R_1$=butyl was present in an amount of 0.67%, and the diacetone alcohol solvent was present in an amount of 90.17%. The percentage reduction of the optical density of dye layer after 90 hours exposure was measured at 578 nm and found to be only 6.5%, showing good photostability.

COMPARATIVE EXAMPLE 3

The method according to Example 10 was repeated except that the cyanine dye of formula (III) was present in an amount of 8.33%, and the diacetone alcohol solvent in an amount of 91.67% and no leuco compound was present. The percentage reduction of the optical density of dye layer after 90 hours exposure measured at 670 nm was found to be 53.3%, showing poor photostability.

COMPARATIVE EXAMPLE 4

The method according to Example 11 was repeated except that the cyanine dye of formula (III) was present in an amount of 8.33%, and the diacetone alcohol solvent in an amount of 91.67% and no leuco compound was present. The percentage reduction of the optical density of dye layer measured at 578 nm was found to be 95.6%, showing very pool photostability.

COMPARATIVE EXAMPLE 5

The method according to Example 10 was repeated except that the anion of the cyanine dye of formula (III) was X⁻=thiocyanate and was present in an amount of 91.5% and no leuco compound was present. The percentage reduction of the optical density of dye layer measured at 670 nm was found to be 94.1%, showing very poor photostability.

COMPARATIVE EXAMPLE 6

The method according to Example 12 was repeated except that the cyanine dye of formula (III) was present in an amount of 7.52%, the aminium dye of formula (V) was present in an amount of 0.83% and the ethyl lactate solvent in an amount of 91.65% and no leuco compound was present. The percentage reduction of the optical density of dye layer measured at 670 nm was found to be only 40.3%, showing poor photostability.

The results of Examples 10 to 15 and Comparative Examples 3 to 6 show that the photostability of dye layers suitable for optical recording, comprising cyanine dyes differing in composition with respect to both cation and anion and in the presence or in the absence of aminium dyes, is significantly increased by the addition of the leuco compounds of the invention.

While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims. All patent applications, patents, and other publications cited herein are incorporated by reference in their entirety.

What is claimed is:

1. A dye composition suitable for forming an optical information recording layer for carrying out recording and readout with laser beams, which comprises at least one cyanine dye of formula (VI):

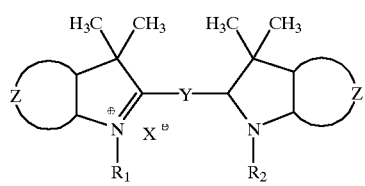

(VI)

wherein $R_1$ and $R_2$ independently represent alkyl groups, Z represents an atomic group for forming a substituted or unsubstituted aromatic ring, and Y represents a linking group for forming a carbocyanine and X⁻ is an anion;

and at least one leuco compound of formulae (VII) or (VIII):

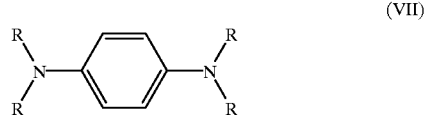

(VII)

where each R=

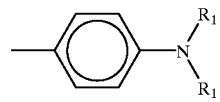

wherein each $R_1$ is independently selected from an alkyl group having a number of carbon atoms from 2 to 5; and

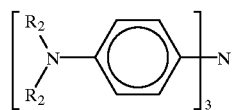

(VIII)

where each $R_2$ is independently selected from an alkyl group having a number of carbon atoms from 1 to 5.

2. The dye composition of claim 1 wherein the amount of said leuco compound is from about 5% to about 35% by weight of the solids in said dye composition.

3. The dye composition of claim 2, wherein said aminium dye is present in said composition in the amount of about 5% to about 30% by weight, based on the total weight of the solid components in said dye composition.

4. The dye composition of claim 1, wherein said cyanine dye has formula (III):

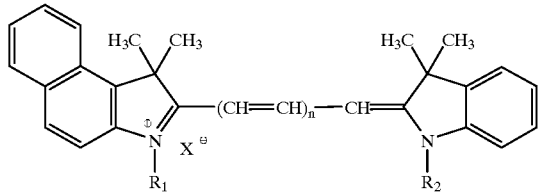

(III)

wherein $R_1$ and $R_2$ are individually selected from alkyl groups having a number of carbon atoms from 1 to 4; n is equal to 1 or 2, and X⁻ is an anion.

5. The dye composition of claim 1, wherein said cyanine dye is a mixture comprising cyanine dyes of formulae (I) and (II):

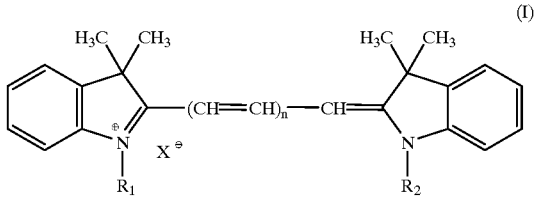

(I)

-continued (II)

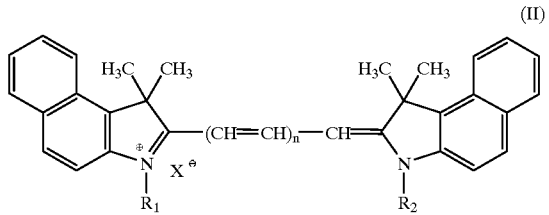

wherein $R_1$ and $R_2$ are individually selected from alkyl groups having a number of carbon atoms from 1 to 4; n is equal to 1 or 2; and $X^-$ is an anion.

6. The dye composition of claim 1 which additionally comprises at least one aminium dye.

7. The dye composition of claim 6 wherein said aminium dye is present in an amount from about 30% to about 5% by weight of the total solid components in said dye composition.

8. The dye composition of claim 6 wherein the aminium dye is of formula (IV):

(IV)

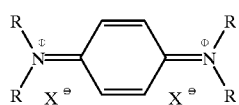

where each r=

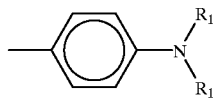

wherein each $R_1$ is individually selected from an alkyl group having a number of carbon atoms from 2 to 5; and wherein the anion is hexafluoroantimonate.

9. The dye composition of claim 6, wherein the an aminium dye is of formula (V):

(V)

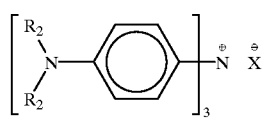

and wherein each $R_2$ is individually selected from an alkyl group having a number of carbon atoms from 2 to 5; and the anion is hexafluoroantimonate.

10. The dye composition of claim 1, wherein the leuco compound has formula (VII):

(VII)

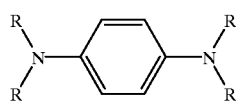

where each R=

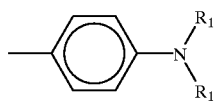

wherein each $R_1$ is an individually selected alkyl group having a number of carbon atoms from 2 to 5.

11. The dye composition of claim 1, wherein said leuco compound has formula (VIII):

(VIII)

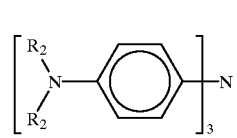

wherein each $R_2$ is an alkyl group having a number of carbon atoms from 1 to 5.

12. The dye composition of claim 1, wherein said cyanine dye is present in said dye composition in an amount from about 60% to about 95% by weight, based on the total weight of the solid components in said dye composition.

13. The dye composition of claim 1, wherein said cyanine dye is asymmetrical.

14. The dye composition of claim 1 wherein the cyanine dye anion $X^-$ is selected from the group consisting of perchlorate, iodide, bromide, aromatic sulfonate, propionate, aromatic carboxylate, thiocyanate, ferricyanate, lactate, hypophosphite, tetracyanonickelate, trifluoromethanesulfonate, dimethyl-2'-hydroxylphenyl-2H-benzotriazole-4-sulfonate,1,2-naptho-2-diazide-5-sulfonate, picrate and azide.

15. The dye composition of claim 1 wherein said dye composition is dissolved in a solvent and said solvent is ethyl lactate.

16. The dye composition of claim 16, wherein said ethyl lactate solvent is present in said composition in the amount of at least 10%, based on the total weight of the liquid components in said dye composition.

17. A recordable medium substrate coated with a dye composition of claim 1.

18. A recordable medium, comprising:

(a) a protective layer;

(b) a reflective layer in proximity to said protective layer;

(c) a recording layer in proximity to said reflective layer and forming an optical interface with said reflective layer, said recording layer comprising a dye composition of claim 1; and (d) a transparent substrate on which said recording layer is formed.

19. A recording system, comprising the recordable medium of claim 18.

20. A dye composition suitable for forming an optical information recording layer for carrying out recording and readout with laser beams, comprising:

(A) at least one cyanine dye of formula (VI):

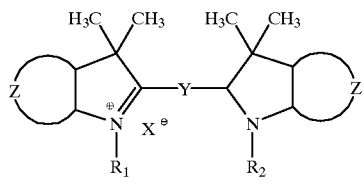
(VI)

wherein $R_1$ and $R_2$ independently represent alkyl groups, Z represents an atomic group for forming a substituted or unsubstituted aromatic ring, and Y represents a linking group for forming a carbocyanine and $X^-$ is an anion;

(B) at least one leuco compound of formulae (VII) or (VIII):

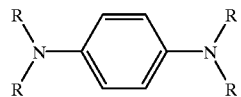
(VII)

where each R=

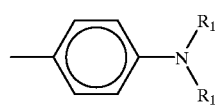

wherein each $R_1$ is independently selected from an alkyl group having a number of carbon atoms from 2 to 5;

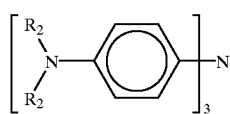
(VIII)

where each $R_2$ is independently selected from an alkyl group having a number of carbon atoms from 1 to 5; and (C) at least one aminium dye.

21. The dye composition of claim 20, wherein the amount of leuco compound is from about 5% to about 35% by weight of the solids in said dye composition.

22. The dye composition of claim 20, wherein said cyanine dye has formula (III):

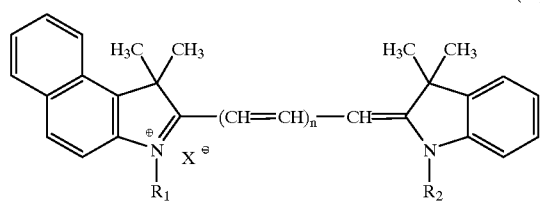
(III)

wherein $R_1$ and $R_2$ are individually selected from alkyl groups having a number of carbon atoms from 1 to 4; n is equal to 1 or 2, and $X^-$ is an anion.

23. The dye composition of claim 20, wherein said cyanine dye is a mixture comprising cyanine dyes of formulae (I) and (II):

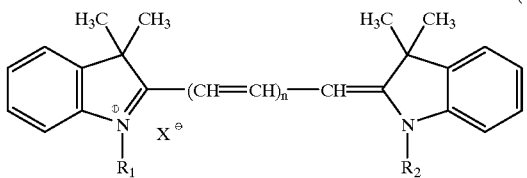
(I)

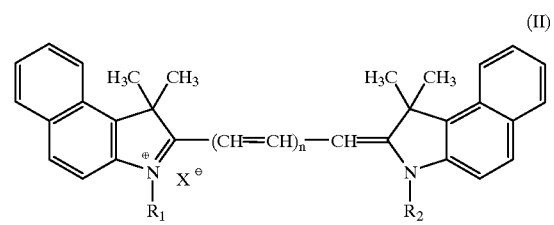
(II)

wherein $R_1$ and $R_2$ are individually selected from alkyl groups having a number of carbon atoms from 1 to 4; n is equal to 1 or 2; and $X^-$ is an anion.

24. The dye composition of claim 20, wherein said aminium dye is present in an amount from about 30% to about 5% by weight of the total solid components in said dye composition.

25. The dye composition of claim 20, wherein the aminium dye is of formula (IV):

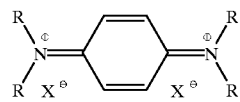
(IV)

where each R=

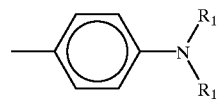

wherein each $R_1$ is individually selected from an alkyl group having a number of carbon atoms from 2 to 5; and wherein the anion is hexafluoroantimonate.

26. The dye composition of claim 20, wherein the an aminium dye is of formula (V):

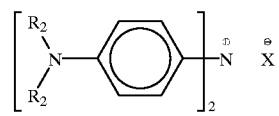
(V)

and wherein each $R_2$ is individually selected from an alkyl group having a number of carbon atoms from 2 to 5; and the anion is hexafluoroantimonate.

27. The dye composition of claim 20, wherein the leuco compound has formula (VII):

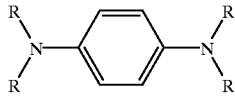

(VII)

where each R=

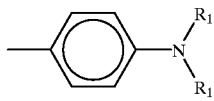

wherein each $R_1$ is an individually selected alkyl group having a number of carbon atoms from 2 to 5.

28. The dye composition of claim 20, wherein said leuco compound has formula (VIII):

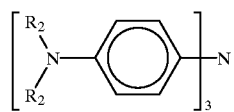

(VIII)

wherein each $R_2$ is an alkyl group having a number of carbon atoms from 1 to 5.

29. The dye composition of claim 20, wherein said cyanine dye is present in said dye composition in an amount from about 60% to about 95% by weight, based on the total weight of the solid components in said dye composition.

30. The dye composition of claim 29, wherein said aminium dye is present in said composition in the amount of about 5% to about 30% by weight, based on the total weight of the solid components in said dye composition.

31. The dye composition of claim 20, wherein said cyanine dye is asymmetrical.

32. The dye composition of claim 20, wherein the cyanine dye anion $X^-$ is selected from the group consisting of perchlorate, iodide, bromide, aromatic sulfonate, propionate, aromatic carboxylate, thiocyanate, ferricyanate, lactate, hypophosphite, tetracyanonickelate, trifluoromethanesulfonate, dimethyl-2'-hydroxylphenyl-2H-benzotriazole-4-sulfonate, 1,2-naptho-2-diazide-5-sulfonate, picrate and azide.

* * * * *